United States Patent
Wang et al.

(10) Patent No.: US 10,663,809 B2
(45) Date of Patent: May 26, 2020

(54) LIQUID CRYSTAL DROPPING AND DISTRIBUTING METHOD AND CELL ASSEMBLING METHOD

(71) Applicants: BOE TECHNOLOGY GROUP CO., LTD., Beijing (CN); Hefei BOE Display Technology Co., Ltd., Anhui (CN)

(72) Inventors: Kai Wang, Beijing (CN); Moonjong Won, Beijing (CN)

(73) Assignees: BOE TECHNOLOGY GROUP CO., LTD., Beijing (CN); HEFEI BOE DISPLAY TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 16/145,464

(22) Filed: Sep. 28, 2018

(65) Prior Publication Data

US 2019/0271870 A1    Sep. 5, 2019

(30) Foreign Application Priority Data

Mar. 1, 2018  (CN) .......................... 2018 1 0172110

(51) Int. Cl.
*G02F 1/1341*    (2006.01)
*G02F 1/1339*    (2006.01)
*G02F 1/1333*    (2006.01)

(52) U.S. Cl.
CPC .......... *G02F 1/1341* (2013.01); *G02F 1/1339* (2013.01); *G02F 2001/13415* (2013.01); *G02F 2001/133354* (2013.01)

(58) Field of Classification Search
CPC ................. G02F 1/1341; G02F 1/1339; G02F 2001/133354; G02F 2001/13415
See application file for complete search history.

(56) References Cited

U.S. PATENT DOCUMENTS

2008/0170197 A1*  7/2008  Byun ..................... G02F 1/1339
                                                             349/189

* cited by examiner

*Primary Examiner* — Nathanael R Briggs
(74) *Attorney, Agent, or Firm* — Calfee, Halter & Griswold LLP (57) ABSTRACT

The present disclosure provides a liquid crystal (LC) dropping and distributing method for a display panel. The LC dropping and distributing method includes forming a first LC region, the first LC region being an equilateral polygon symmetric about its center and having a first symmetric axis and a second symmetric axis perpendicular to each other; and forming two second LC regions, the two second LC regions being located at two sides of the first LC region respectively and being symmetric about the first symmetric axis, and the two second LC regions being both disposed to be spaced apart from the first LC region, each of the two second LC regions including a plurality of LC sub-regions arranged at intervals.

16 Claims, 3 Drawing Sheets

| Forming a first LC region, the first LC region is configured as an equilateral polygon symmetric about its center, and has a first symmetric axis and a second symmetric axis perpendicular to each other | S10 |

| Forming two second LC regions, the two second LC regions are located at two sides of the first LC region respectively and are symmetric about the first symmetric axis, the two second LC regions are both spaced apart from the first LC region, and each of the two second LC regions includes a plurality of LC sub-regions arranged at intervals | S20 |

LIQUID CRYSTAL DROPPING AND DISTRIBUTING METHOD AND CELL ASSEMBLING METHOD

CROSS-REFERENCE

The present disclosure claims priority of Chinese Patent Application No. 201810172110.4 filed on Mar. 1, 2018, the disclosure of which is incorporated in the present application by reference in its entirety.

TECHNICAL FIELD

The present disclosure relates to the field of liquid crystal display technology, and particularly to a liquid crystal (LC) dropping and distributing method and a cell assembling method.

BACKGROUND

At present, it has entered an era of display, and requirements on various types of displayers have become normal. Among others, thin film transistor liquid crystal display (TFT-LCD) device that possesses advantages such as small size, low power consumption and no radiation can well satisfy people's requirements on displayers, and hence is widely used. A LCD screen basically includes an upper color filter (CF) substrate, a lower array substrate and a middle LC layer. A process of dropping and distributing the LC and a process of cell assembling are significant steps in a manufacturing method of a LCD panel. Injection of the LC can be mainly classified into a pouring mode and a dropping mode, in which the dropping mode possesses advantages of higher speed, more accurate dropping control, flexible design of dropping pattern, and more distinct display effect, and hence is more widely used.

Subsequent to a completion of LC dropping is the important, cell assembling process. In order to maintain a spaced distance between two layers of substrates, a spacer has to be used there-between. Generally, a columnar spacer is formed on the CF substrate by using a resin material through an exposure process. When the upper substrate is pressed downwards during the cell assembling process, a stress between the substrates is mainly distributed among the LC layer, the spacer and a sealant. The spacer is periodically distributed in the display panel and is subjected to a relatively uniform stress; the LC layer, as a liquid, can also provide the stress with uniform buffering effect. After completing the cell assembling process and before curing the sealant, in order to prevent the LC layer from contacting with the sealant after diffusing, a space with a certain distance can be reserved between the LC layer and the sealant. However, an air bubble may be generated at a corner due to relatively greater distance and slower diffusion.

It should be explained that, the above information disclosed in the "BACKGROUND" portion is merely used to enhance the understanding of the context of the present disclosure, and hence may include information not constituting related technology which is well-known for those skilled in the art.

SUMMARY

According to the first aspect of the present disclosure, a liquid crystal (LC) dropping and distributing method for display panel is provided. The method including: forming a first LC region, the first LC region being an equilateral polygon symmetric about its center and having a first symmetric axis and a second symmetric axis perpendicular to each other; and forming two second LC regions, the two second LC regions being located at two sides of the first LC region respectively and being symmetric about the first symmetric axis, and the two second LC regions being both disposed to be spaced apart from the first LC region, each of the two second LC regions including a plurality of LC sub-regions arranged at intervals.

In an exemplary embodiment of the present disclosure, forming the second LC region includes: forming a plurality of first LC sub-regions, each of the plurality of first LC sub-regions being a parallelogram and being located at a side of a corresponding edge of the equilateral polygon far away from the center of the equilateral polygon, and a group of edges of the parallelogram being parallel to an edge of the equilateral polygon adjacent to the group of edges of the parallelogram; and forming a plurality of second LC sub-regions, each of the plurality of second LC sub-regions being a right triangle and being correspondingly located at a side of the parallelogram far away from the equilateral polygon, and a hypotenuse of the right triangle being parallel to an edge of the parallelogram adjacent to the hypotenuse of the right triangle, wherein right angles of four right triangles are correspondingly located at four corners of the display panel.

In an exemplary embodiment of the present disclosure, the equilateral polygon is an equilateral hexagon, the equilateral hexagon includes: two first edges parallel to a long edge of the display panel; and four second edges.

In an exemplary embodiment of the present disclosure, forming the second LC region includes: forming two first LC sub-regions, the two first LC sub-regions being symmetric about the second symmetric axis and spaced apart, and being located at a side of the second edge far away from a center of the equilateral hexagon, the first LC sub-region being a parallelogram, the parallelogram having a first group of edges and a second group of edges, the first group of edges being parallel to the second edge of the equilateral hexagon; and forming two second LC sub-regions, the two second LC sub-regions being symmetric about the second symmetric axis and spaced apart, and being located at a side of the first LC sub-regions far away from the first LC region, the second LC sub-region being a right triangle, a right angle of the right triangle being located at a corner of the display panel, and a hypotenuse of the right triangle being parallel to the first group of edges; wherein one edge of the second group of edges, the first edge, and one right-angle side of the right triangle are collinear to form a long edge of a display region, and the other right-angle sides of two right triangles form a short edge of the display region.

In an exemplary embodiment of the present disclosure, a length of an edge in the second group of edges is as same as a length of an edge of the equilateral hexagon.

In an exemplary embodiment of the present disclosure, at a side of the long edge of the display region, a spaced distance between the equilateral hexagon and the parallelogram is a first spaced distance, a spaced distance between the parallelogram and the right triangle is a second spaced distance, and the first spaced distance is equal to the second spaced distance; and at a side of the short edge of the display region, a spaced distance between the right triangle and the parallelogram is a third spaced distance, a spaced distance between two parallelograms is a fourth spaced distance, and the third spaced distance is equal to the fourth spaced distance.

In an exemplary embodiment of the present disclosure, at the side of the short edge of the display region, a sum of the fourth spaced distance and two third spaced distances is a length of the right-angle side of the right triangle at the side of the short edge.

In an exemplary embodiment of the present disclosure, the equilateral polygon is an equilateral octagon, the equilateral octagon includes: two first edges parallel to a long edge of the display panel; four second edges; and two third edges perpendicular to the first edges and parallel to a short edge of the display panel.

In an exemplary embodiment of the present disclosure, forming the second LC region includes: forming two first LC sub-regions, the two first LC sub-regions being symmetric about the second symmetric axis and spaced apart, and being located at a side of the second edge far away from a center of the equilateral octagon, the first LC sub-region being a parallelogram, the parallelogram having a first group of edges and a second group of edges, the first group of edges being parallel to the second edge of the equilateral octagon; forming two second LC sub-regions, the two second LC sub-regions being symmetric about the second symmetric axis and spaced apart, and being located at a side of the first LC sub-regions far away from the first LC region, the second LC sub-region being a right triangle, a right angle of the right triangle being located at a corner of the display panel, and a hypotenuse of the right triangle being parallel to the first group of edges; and forming a third LC sub-region, the third LC sub-region being symmetric about the second symmetric axis and being located between two first LC sub-regions, the third LC sub-region being a rectangle, a group of edges of the rectangle being parallel to the third edge; wherein one edge of the second group of edges, the first edge, and one right-angle side of the right triangle are collinear to form a long edge of a display region, one edge of the rectangle far away from the equilateral octagon and the other right-angle sides of two right triangles form a short edge of the display region.

In an exemplary embodiment of the present disclosure, a length of an edge of the second group of edges is as same as a length of an edge of the equilateral octagon.

According to the second aspect of the present disclosure, a cell assembling method is provided. The method including: providing a first substrate; dropping and distributing a liquid crystal (LC) onto the first substrate according to the LC dropping and distributing method mentioned above, to form a LC layer; providing a second substrate, and assembling the second substrate with the first substrate to form a cell, so that the LC layer between the second substrate and the first substrate is diffused uniformly.

BRIEF DESCRIPTION OF THE DRAWINGS

The drawings herein incorporated into the description as a part of the description illustrate embodiments in accordance with the present disclosure and are used to explain the principle of the present disclosure in connection with the description. Obviously, the described drawings below are merely related to some of the embodiments of the present disclosure. For those ordinary skilled in the art, other drawings may be obtained according to these drawings without any creative labor.

DETAILED DESCRIPTION

Hereinafter, exemplary embodiments of the present disclosure will be described in a more complete way with reference to the drawings. However, the exemplary embodiments of the present disclosure may be implemented in various ways, and should not be interpreted as being limited to the exemplary embodiments herein; the described feature(s), structure(s) or characteristic(s) may be combined in one or more embodiment in any appropriate way. In the description below, plenty of details will be provided so that the embodiments of the present disclosure are fully understandable. However, those skilled in the art will be appreciated that, technical solution(s) of the present disclosure may be implemented without one or more of these specific details, or other method(s), element(s), device(s), step(s) and the like may be adopted. Under other circumstances, well-known technical solution(s) will not be illustrated or described in detail, so as not to obscure various aspects of the present disclosure due to distraction.

Moreover, the drawings are merely exemplary illustrations of the present disclosure and are not necessarily drawn to scale. Throughout the drawings, identical reference numerals indicate identical or similar parts, and hence repetitive description thereof will be omitted.

Figure 1:
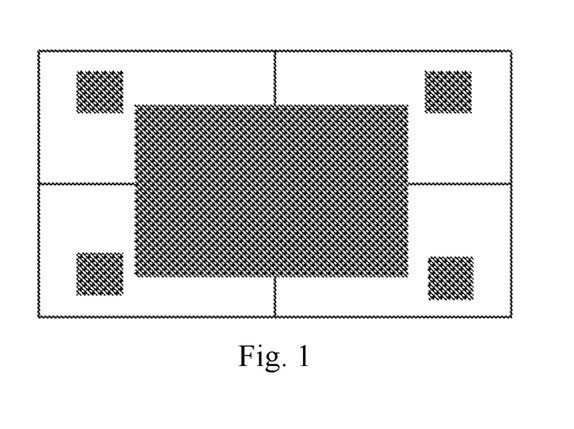
FIG. 1 illustrates a schematic diagram of an example LC distribution structure in the related technology.

Referring to FIG. 1 which illustrates a schematic diagram of an example LC distribution structure in the related technology. The related technology usually is to add four small patterns at four corners, with an integrally formed larger pattern in the center. Under external force, a stress subjected by the larger pattern in the center is considerably different from that subjected by the surrounding regions having no liquid crystal, which leads to a stress imbalance and hence an uneven force applied on the sealant. The sealant having not been cured would be deformed under such uneven force, which results in a deformation of the sealant after the sealant is cured, so that a photoelastic effect would be occurred at a periphery of the displayer due to the stress imbalance, i.e., resulting in a certain degree of birefringence effect, and hence leading to an uneven brightness and also a light leakage at the periphery.

Figure 2:
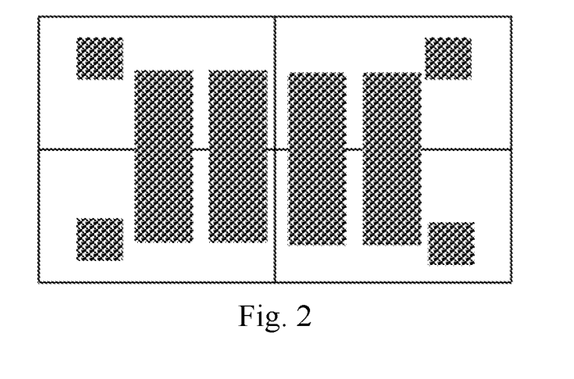
FIG. 2 illustrates a schematic diagram of another example LC distribution structure in the related technology.

Referring to FIG. 2 which illustrates a schematic diagram of another example LC distribution structure in the related technology, the integrally formed pattern in the center is divided into four sub-portions, such pattern design can mitigate the issue of uneven brightness and light leakage at the periphery to some extent but is likely to result in a defection of strip-shaped brightness difference in the vertical direction. A major reason for this is that, when the vertical sub-portions are subjected to external force, a middle portion of the strip-shaped pattern has a diffusion velocity considerably different from that of the two ends of the strip-shaped pattern, and the topmost LC layer is subjected to a force different from that applied by an alignment film, which finally results in a certain memory effect to be presented on the product; a reduced distance between patterns can mitigate the degree of the detections but also weakens a diffusion effect acted on the stress at the periphery; as a result, it's difficult to play a role of mitigating the issue of uneven brightness and light leakage at the periphery.

Therefore, it's necessary to study in a LC dropping and distributing method as well as a cell assembling method.

Figure 3:
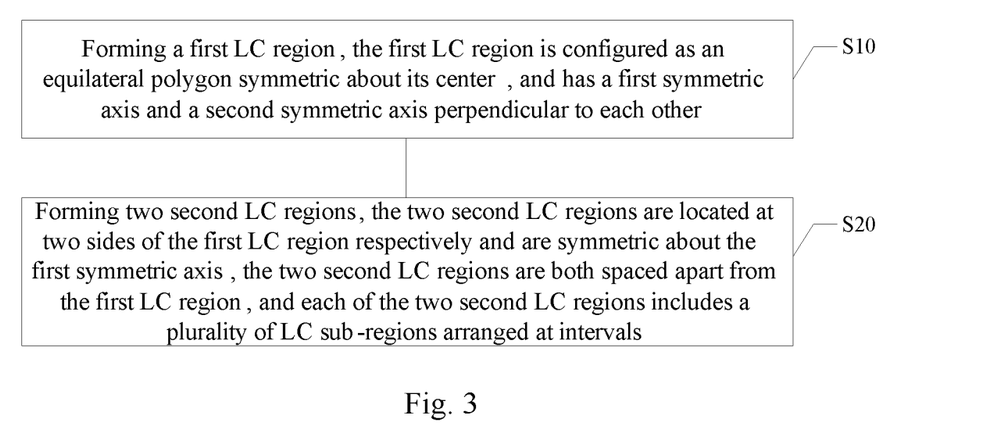
FIG. 3 illustrates a flow chart of a LC dropping and distributing method.

An exemplary embodiment of the present disclosure, first of all, provides a LC dropping and distributing method, the LC dropping distributing method is applied for a display panel. Referring to the flow chart of the LC dropping and distributing method as illustrated in FIG. 3, the LC dropping and distributing method can include steps as below.

In step S10, a first LC region is formed. The first LC region is an equilateral polygon symmetric about its center, and has a first symmetric axis 1 and a second symmetric axis 2 which are perpendicular to each other.

In step S20, two second LC regions are formed. The two second LC regions are located at two sides of the first LC region respectively and are symmetric about the first symmetric axis 1. The two second LC regions are both spaced apart from the first LC region. Each of the two second LC regions includes a plurality of LC sub-regions arranged at intervals.

According to the LC dripping and distributing method in the present exemplary embodiment, on one aspect, the first LC region is an equilateral polygon symmetric about its center, so as to ensure that when upper and lower substrates are pressed downwards to be assembled into a cell, the first LC region that is subjected to a force can be diffused to all directions at a same velocity, with the stress also being diffused uniformly, so as to eliminate the defection of strip-shaped brightness difference which is likely caused by the strip-shaped sub-portions. On another hand, the two second LC regions are symmetrically located at two sides of the first LC region respectively so that the entire LC layer can be diffused uniformly. On yet another hand, each of the two second LC regions includes a plurality of LC sub-regions arranged at intervals, so that an area and also a side length of the sub-portion in each of the LC sub-regions are decreased, and a diffusion distance of each of the LC sub-regions during the cell assembling process is smaller as compared to the original design. As a result, a distance from the LC layer to the sealant is decreased, which is more advantageous for the LC layer to share the stress subjected by the sealant. Therefore, the defection of uneven brightness and light leakage occurred at the periphery can be well mitigated; the reduced distance between the LC layer and the sealant also felicitates the diffusion of LC towards four corners, so as to mitigate the defection of air bubble caused by insufficient LC diffused to the corners; moreover, during a subsequent process of picking and delivering the display panel by using a robot, the robot may cause a partial stress imbalance at boundary and edges of the display panel; due to the reduced distance between the LC and the sealant, the LC can sufficiently diffuse the stress so as to prevent from the defection such as yellowed display and light leakage at the periphery which may be caused by excessively small distance between the upper and lower substrates in partial regions of the periphery.

Hereinafter, the LC dropping and distributing method in the present exemplary embodiment will be described in more details.

In step S10, a first LC region is formed. The first LC region is an equilateral polygon symmetric about its center, and has a first symmetric axis 1 and a second symmetric axis 2 which are perpendicular to each other.

In the present exemplary embodiment, the equilateral polygon that is symmetric about its center is an equilateral polygon having an even number of sides. For example, the first LC region can be an equilateral hexagon, an equilateral octagon, an equilateral decagon and the like. The more sides do the equilateral polygon have, the more uniform the distributed force will be, and the more uniform the diffusion velocity in all directions will be. The first symmetric axis 1 can be a symmetric axis perpendicular to a long edge 10 of the display panel; the second symmetric axis 2 can be a symmetric axis perpendicular to a short edge 9 of the display panel, that is, parallel to the long edge. Of course, the arrangements of the first symmetric axis 1 and the second symmetric axis 2 can be exchanged.

In step S20, two second LC regions are formed. The two second LC regions are located at two sides of the first LC region respectively and are symmetric about the first symmetric axis 1. The two second LC regions are both disposed to be spaced apart from the first LC region. Each of the two second LC regions includes a plurality of LC sub-regions arranged at intervals.

In the present exemplary embodiment, the two second LC regions are both symmetric about the first symmetric axis 1; thus spaces between the two second LC regions and the first LC region are also symmetric about the first symmetric axis 1. Hereinafter one of the second LC regions is described by way of example. The space between the second LC region and the first LC region is uniform. That is to say, a side of the second LC region close to the first LC region and a side of the first LC region close to the second LC region have the same shape; furthermore, a contour line of the side of the second LC region close to the first LC region and a contour line of the side of the first LC region close to the second LC region are parallel to each other.

In an embodiment, forming the second LC region includes: forming a plurality of first LC sub-regions, each of the plurality of first LC sub-regions being a parallelogram and being located at a side of a corresponding edge of the equilateral polygon far away from the center of the equilateral polygon, and a group of edges of the parallelogram being parallel to an edge of the equilateral polygon adjacent to the group of edges of the parallelogram. Each of the edges of the equilateral polygon located at two sides of the first symmetric axis 1 is provided with a first LC sub-region at one side of the edge far away from the center of the equilateral polygon. The first LC sub-region is a parallelogram. Some special parallelograms can include rectangle, square and rhombus. In the case where an edge of the equilateral polygon is parallel to the first symmetric axis 1, a first LC sub-region corresponding to this edge can be a rectangle or a square. In the case where an extension line of an edge of the equilateral polygon is intersected with the first symmetric axis 1, a first LC sub-region corresponding to this edge can be a parallelogram (not including a rectangle and a square) or a rhombus.

Forming the second LC region further includes: forming a plurality of second LC sub-regions, each of the plurality of second LC sub-regions being a right triangle and being correspondingly located at a side of the parallelogram far away from the equilateral polygon, and a hypotenuse of the right triangle being parallel to an edge of the parallelogram adjacent to the hypotenuse of the right triangle. Right angles of four right triangles are correspondingly located at four corners of the display panel. In the case where the first LC sub-region is a parallelogram (not including a rectangle and a square) or a rhombus, one side of the first LC sub-region far away from the equilateral polygon is provided with a second LC sub-region; a second LC sub-region being a right triangle is combined with a first LC sub-region to form a shape with two right-angle sides. In the case where the first LC sub-region is a rectangle or a square, one side of the first LC sub-region far away from the equilateral polygon may not be provided with any second LC sub-region; in such case, the first LC sub-region itself has four right-angle sides, so as to be cooperated with other LC sub-regions.

Hereinafter the LC dropping and distributing method of the present disclosure will be described in more details with reference to three exemplary embodiments.

Figure 4:
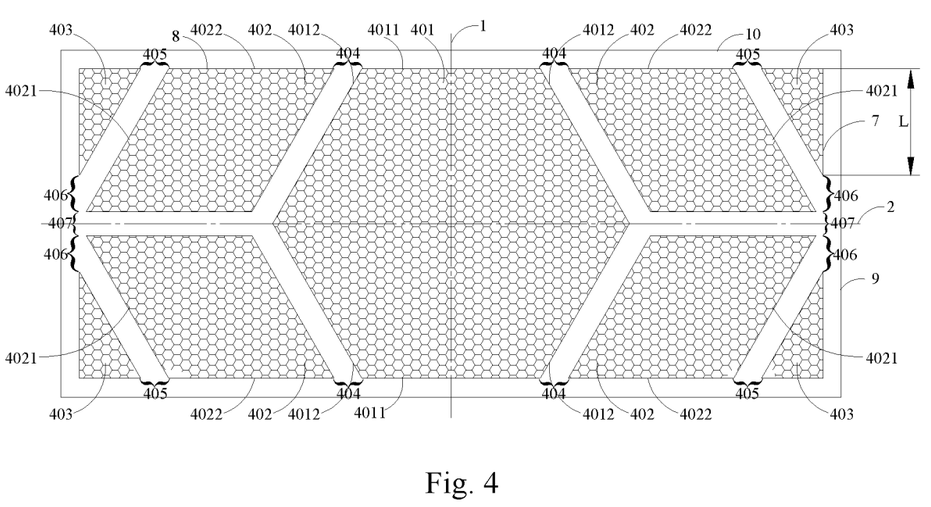
FIG. 4 illustrates a schematic diagram of an example LC distribution structure formed by the LC dropping and distributing method in the present disclosure.

Referring to FIG. 4, which illustrates a schematic diagram of an example LC distribution structure formed by the LC dropping and distributing method in the present disclosure.

In the present exemplary embodiment, the equilateral polygon of the first LC region can be an equilateral hexagon 401. The equilateral hexagon 401 can include two first edges 4011 and four second edges 4012; the two first edges 4011 are parallel to the long edge 10 of the display panel, that is, perpendicular to the first symmetric axis 1; extension lines of the four second edges 4012 are all intersected with the first symmetric axis 1.

The two second LC regions are symmetric about the first symmetric axis 1. Therefore, one of the second LC regions will be described as below by way of example. Forming the second LC region can include forming two first LC sub-regions 402 and forming two second LC sub-regions 403, and the like.

In the present exemplary embodiment, the two first LC sub-regions 402 are symmetric about the second symmetric axis 2 and spaced apart. The two first LC sub-regions 402 are located at a side of the second edge 4012 far away from a center of the equilateral hexagon 401. The first LC sub-region 402 is a parallelogram, the parallelogram has a first group of edges 4021 and a second group of edges 4022, the first group of edges 4021 are parallel to the second edge 4012 of the equilateral hexagon 401. A length of each of the second group of edges 4022 can be as same as a length of an edge of the equilateral hexagon 401. Because a space exists between the two first LC sub-regions 402, a length of each of the first group of edges 4021 is smaller than the length of the edge of the equilateral hexagon 401.

In the present exemplary embodiment, the two second LC sub-regions 403 are also symmetric about the second symmetric axis 2 and spaced apart, and the two second LC sub-regions 403 are located at a side of the first LC sub-regions 402 far away from the first LC region. The second LC sub-region 403 is a right triangle, a right angle of the right triangle is located at a corner of the display panel, and a hypotenuse of the right triangle is parallel to the first group of edges 4021.

In the present exemplary embodiment, one edge of the second group of edges 4022, the first edge 4011, and one right-angle side of the right triangle are collinear to form a long edge 8 of a display region, the long edge 8 of the display region is parallel to the long edge 10 of the display panel. The other right-angle sides of two right triangles form a short edge 7 of the display region, and the short edge 7 of the display region is parallel to the short edge 9 of the display panel.

In the present exemplary embodiment, at a side of the long edge 8 of the display region, a spaced distance between the equilateral hexagon 401 and the parallelogram is a first spaced distance 404, a spaced distance between the parallelogram and the right triangle is a second spaced distance 405, and the first spaced distance 404 can be equal to the second spaced distance 405. With this arrangement, a stress buffer can be achieved in the LC which has symmetrical equidistance with respect to the long edge 8 of the display region.

In the present exemplary embodiment, at a side of the short edge 7 of the display region, a spaced distance between the right triangle and the parallelogram is a third spaced distance 406, a spaced distance between two parallelograms is a fourth spaced distance 407, and the third spaced distance 406 can be equal to the fourth spaced distance 407. At the side of the short edge 7 of the display region, a sum of the fourth spaced distance 407 and two third spaced distances 406 can be equal to a length L of the right-angle side of the right triangle at the side of the short edge. With this arrangement, a stress buffer can be achieved in the LC which has symmetrical equidistance with respect to the short edge 7 of the display region.

Figure 5:
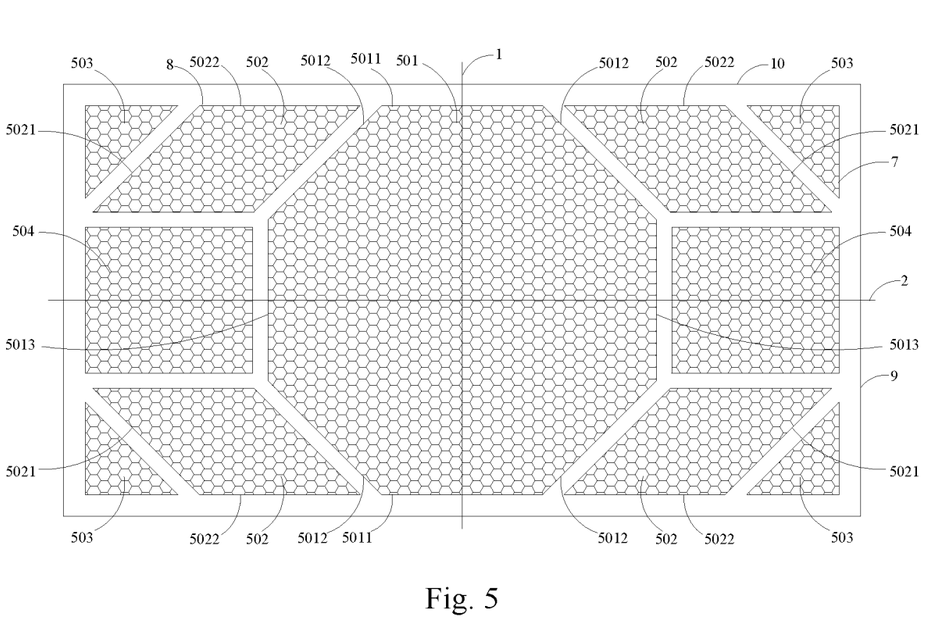
FIG. 5 illustrates a schematic diagram of another example LC distribution structure formed by the LC dropping and distributing method in the present disclosure.

Referring to FIG. 5, which illustrates a schematic diagram of another example LC distribution structure formed by the LC dropping and distributing method in the present disclosure.

In the present exemplary embodiment, the equilateral polygon of the first LC region can be an equilateral octagon 501; the equilateral octagon 501 includes two first edges 5011, four second edges 5012 and two third edges 5013. The two first edges 5011 are parallel to the long edge 10 of the display panel, that is, perpendicular to the first symmetric axis 1; the two third edges 5013 are perpendicular to the first edge 5011 and are parallel to the short edge 9 of the display panel, that is, parallel to the first symmetric axis 1. Extension lines of the four second edges 5012 are intersected with the first symmetric axis 1.

The two second LC regions are symmetric about the first symmetric axis 1. Therefore, one of the second LC regions will be described as below by way of example. Forming the second LC region can include forming two first LC sub-regions 502, forming two second LC sub-regions 503 and forming one third LC sub-regions 504, and the like.

In the present exemplary embodiment, the two first LC sub-regions 502 are symmetric about the second symmetric axis 2 and spaced apart, and the two first LC sub-regions 502 are located at a side of the second edge 5012 far away from a center of the equilateral octagon 501. The first LC sub-region 502 is a parallelogram, the parallelogram has a first group of edges 5021 and a second group of edges 5022, the first group of edges 5021 are parallel to the second edge 5012 of the equilateral octagon 501. Because a space exists between the first LC sub-region 502 and the third LC sub-region 504, a length of each of the first group of edges 5021 is smaller than a length of an edge of the equilateral octagon 501. A length of each of the second group of edges 5022 can be as same as the length of the edge of the equilateral octagon 501.

In the present exemplary embodiment, the two second LC sub-regions 503 are symmetric about the second symmetric axis 2 and spaced apart, and are located at a side of the first LC sub-regions 502 far away from the first LC region. The second LC sub-region 503 is a right triangle, a right angle of the right triangle is located at a corner of the display panel, and a hypotenuse of the right triangle is parallel to the first group of edges 5021.

In the present exemplary embodiment, the third LC sub-region 504 is symmetric about the second symmetric axis 2 and is located between two first LC sub-regions 502. The third LC sub-region 504 is a rectangle, one group of edges of the rectangle are parallel to the third edge 5013, and the other group of edges of the rectangle are parallel to the second group of edges 5022 of the parallelogram.

In the present exemplary embodiment, one edge of the second group of edges 5022, the first edge 5011, and one right-angle side of the right triangle are collinear to form the long edge 8 of the display region, the long edge 8 of the display region is parallel to the long edge 10 of the display panel. One edge of the rectangle far away from the equilateral octagon 501 and the other right-angle sides of two right triangles form the short edge 7 of the display region, the short edge 7 of the display region is parallel to the short edge 9 of the display panel.

Figure 6:
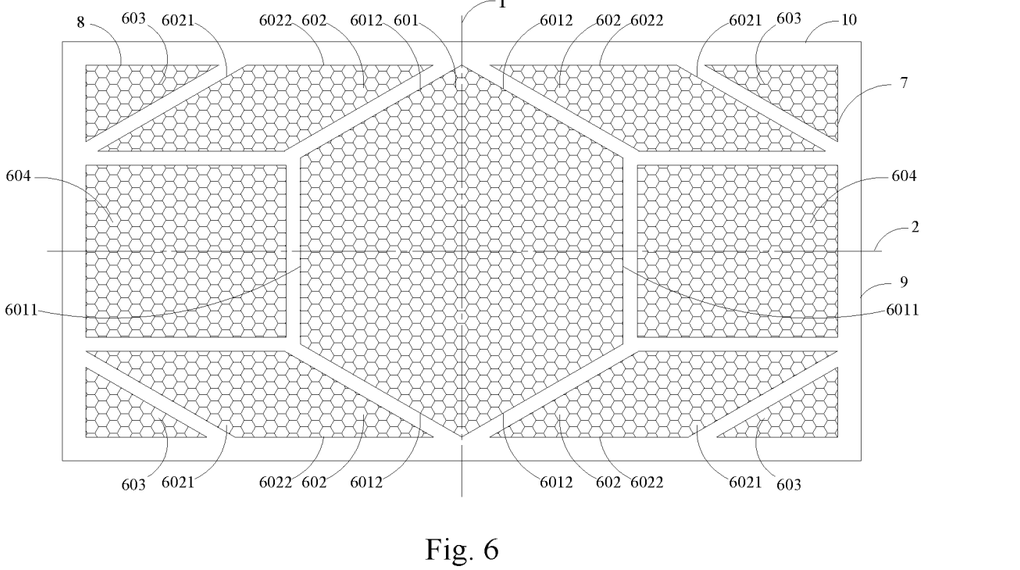
FIG. 6 illustrates a schematic diagram of yet another example LC distribution structure formed by the LC dropping and distributing method in the present disclosure.

Referring to FIG. 6 which illustrates a schematic diagram of yet another example LC distribution structure formed by the LC dropping and distributing method in the present disclosure.

In the present exemplary embodiment, the equilateral polygon of the first LC region can be an equilateral hexagon 601. The equilateral hexagon 601 can include two first edges 6011 and four second edges 6012; the two first edges 6011 are parallel to the short edge 9 of the display panel, that is, parallel to the first symmetric axis 1; extension lines of the four second edges 6012 are all intersected with the first symmetric axis 1.

The two second LC regions are symmetric about the first symmetric axis 1. Therefore, one of the second LC regions will be described as below by way of example. Forming the second LC region can include forming two first LC sub-regions 602, forming two second LC sub-regions 603, and forming one third LC sub-region 604, and the like.

In the present exemplary embodiment, the two first LC sub-regions 602 are symmetric about the second symmetric axis 2 and spaced apart. The two first LC sub-regions 602 are located at a side of the second edge 6012 far away from a center of the equilateral hexagon 601. The first LC sub-region 602 is a parallelogram, the parallelogram has a first group of edges 6021 and a second group of edges 6022, the first group of edges 6021 are parallel to the second edge 6012 of the equilateral hexagon 601. Because a space exists between the first LC sub-regions 602 and the third LC sub-region 604, a length of each of the first group of edges 6021 is smaller than a length of an edge of the equilateral hexagon 601. A length of each of the second group of edges 6022 can be as same as the length of the edge of the equilateral hexagon 601.

In the present exemplary embodiment, the two second LC sub-regions 603 are symmetric about the second symmetric axis 2 and spaced apart, and are located at a side of the first LC sub-regions 602 far away from the first LC region. The second LC sub-region 603 is a right triangle, a right angle of the right triangle is located at a corner of the display panel, and a hypotenuse of the right triangle is parallel to the first group of edges 6021.

In the present exemplary embodiment, the third second LC sub-region 604 is symmetric about the second symmetric axis 2, and is located between the two first LC sub-regions 602. The third LC sub-region 604 is a rectangle, one group of edges of the rectangle are parallel to the first edge 6011, and the other group of edges of the rectangle are parallel to the second group of edges 6022 of the parallelogram.

In the present exemplary embodiment, one edge of the second group of edges 6022 and one right-angle side of the right triangle are collinear to form the long edge 8 of the display region, the long edge 8 of the display region is parallel to the long edge 10 of the display panel. One edge of the rectangle far away from the equilateral hexagon 601 and the other right-angle sides of two right triangles form the short edge 7 of the display region, the short edge 7 of the display region is parallel to the short edge 9 of the display panel.

Additionally, although various steps in the method of the present disclosure are described in a particular sequence in the drawings, it's not intended to require or imply that these steps have to be performed in accordance with such particular sequence or all these steps as illustrated have to be performed to achieve the desirable effect(s). Additionally or optionally, certain step(s) may be omitted, multiple steps may be combined into a single step to be performed, and/or one of these steps may be divided into multiple ones, or the like. For example, it's possible to form the second LC region firstly, and then form the first LC region. During forming the second LC regions, it's also possible to form the plurality of second LC sub-regions firstly, and then form the plurality of first LC sub-regions; it's also possible to form part of the second LC sub-regions firstly and then form part of the first LC sub-regions, and to complete the second LC sub-regions firstly and then complete the first LC sub-regions, or the like, without repeating the details thereof.

Figure 7:
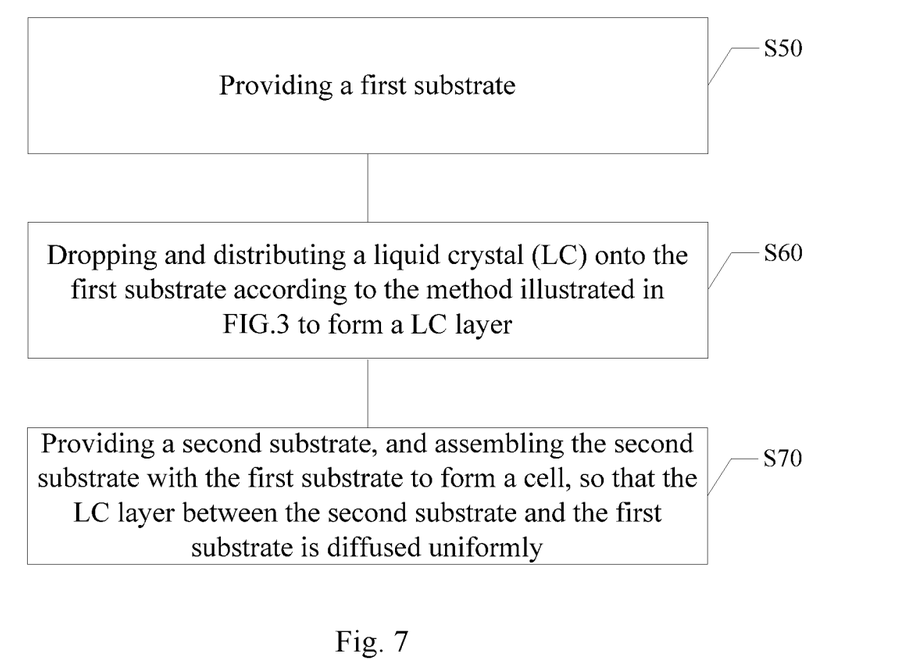
FIG. 7 illustrates a flow chart of a cell assembling method in the present disclosure.

In an embodiment, the present disclosure further provides a cell assembling method. As illustrated in FIG. 7, the cell assembling method can include the following steps.

In step S50, a first substrate is provided.

In step S60, dropping and distributing a liquid crystal (LC) onto the first substrate is performed according to the LC dropping and distributing method mentioned above, to form a LC layer.

In step S70, a second substrate is provided, and the second substrate is assembled with the first substrate to form a cell, so that the LC layer between the second substrate and the first substrate is diffused uniformly.

The LC dropping and distributing method has been specifically described in the above, without repeating the details herein.

According to the LC dripping and distributing method of the present disclosure, the first LC region as formed is an equilateral polygon symmetric about its center, the two second LC regions as formed are symmetric about the first symmetric axis and are located at two sides of the first LC region respectively; moreover, the two second LC regions are both spaced apart from the first LC region, each of the two second LC regions includes a plurality of LC sub-regions arranged at intervals. On one aspect, the first LC region is an equilateral polygon symmetric about its center, so as to ensure that when upper and lower substrates are pressed downwards to be assembled into a cell, the first LC region that is subjected to a force can be diffused to all directions at a same velocity, with the stress also being diffused uniformly, so as to eliminate the defection of strip-shaped brightness difference which is likely caused by the strip-shaped sub-portions. On another hand, the two second LC regions are symmetrically located at two sides of the first LC region respectively so that the entire LC layer can be diffused uniformly. On yet another hand, each of the two second LC regions includes a plurality of LC sub-regions arranged at intervals, so that an area and also a side length of the sub-portion in each of the LC sub-regions are decreased, and a diffusion distance of each of the LC sub-regions during the cell assembling process is smaller as compared to the original design. As a result, a distance from the LC layer to the sealant is decreased, which is more advantageous for the LC layer to share the stress subjected by the sealant. Therefore, the defection of uneven brightness and light leakage occurred at the periphery can be well mitigated; the reduced distance between the LC layer and the sealant also felicitates the diffusion of LC towards four corners, so as to mitigate the defection of air bubble caused by insufficient LC diffused to the corners; moreover, during a subsequent process of picking and delivering the display panel by using a robot, the robot may cause a partial stress imbalance at boundary and edges of the display panel; due to the reduced distance between the LC and the sealant, the LC can sufficiently diffuse the stress so as to prevent from the defection such as yellowed display and light leakage at the periphery which may be caused by excessively small distance between the upper and lower substrates in partial regions of the periphery.

From the specification and practicing the invention disclosed herein, other implementing mode(s) may be easily conceivable for those skilled in the art. The present disclosure is intended to cover any variation, purpose or adaptive modification of the present disclosure which is in accordance with the generic principle of the present disclosure and to include common knowledge or conventional technical measures in the technical field to which the present disclosure pertains. The specification and the embodiment(s) are merely deemed as exemplary, and the true scope and spirit of the present disclosure are indicated by the appended claims.

What is claimed is:

1. A liquid crystal (LC) dropping and distributing method for a display panel, comprising:
   forming a first LC region, the first LC region being an equilateral polygon symmetric about a center of the first LC region and having a first symmetric axis and a second symmetric axis perpendicular to each other; and
   forming two second LC regions, the two second LC regions being located at two sides of the first LC region respectively and being symmetric about the first symmetric axis, and the two second LC regions being both spaced apart from the first LC region, each of the two second LC regions comprising a plurality of LC sub-regions arranged at intervals,
   wherein the equilateral polygon is an equilateral hexagon, and the equilateral hexagon comprises:
   two first edges parallel to a long edge of the display panel; and
   four second edges.

2. The LC dropping and distributing method according to claim 1, wherein the step of forming the second LC region comprises:
   forming two first LC sub-regions, the two first LC sub-regions being symmetric about the second symmetric axis and spaced apart, and being located at a side of the second edge far away from the center of the first LC region, the first LC sub-region being a parallelogram, the parallelogram having a first group of edges and a second group of edges, wherein the first group of edges being parallel to one of the second edges of the equilateral hexagon; and
   forming two second LC sub-regions, the two second LC sub-regions being symmetric about the second symmetric axis and spaced apart, and being located at a side of the first LC sub-regions far away from the first LC region, the second LC sub-region being a right triangle, a right angle of the right triangle being located at a corner of the display panel, and a hypotenuse of the right triangle being parallel to the first group of edges,
   wherein one edge of the second group of edges, the first edge, and one right-angle side of the right triangle are collinear to form a long edge of a display region, and the other right-angle sides of two right triangles form a short edge of the display region.

3. The LC dropping and distributing method according to claim 2, wherein a length of an edge in the second group of edges is as same as a length of an edge of the equilateral hexagon.

4. The LC dropping and distributing method according to claim 2, wherein at a side of the long edge of the display region, a spaced distance between the equilateral hexagon and the parallelogram is a first spaced distance, a spaced distance between the parallelogram and the right triangle is a second spaced distance, and the first spaced distance is equal to the second spaced distance; and
   at a side of the short edge of the display region, a spaced distance between the right triangle and the parallelogram is a third spaced distance, a spaced distance between two parallelograms is a fourth spaced distance, and the third spaced distance is equal to the fourth spaced distance.

5. The LC dropping and distributing method according to claim 4, wherein at the side of the short edge of the display region, a sum of the fourth spaced distance and two third spaced distances equals to a length of the right-angle edge of the right triangle at the side of the short edge.

6. A liquid crystal (LC) dropping and distributing method for a display panel, comprising:
   forming a first LC region, the first LC region being an equilateral polygon symmetric about a center of the first LC region and having a first symmetric axis and a second symmetric axis perpendicular to each other; and
   forming two second LC regions, the two second LC regions being located at two sides of the first LC region respectively and being symmetric about the first symmetric axis, and the two second LC regions being both spaced apart from the first LC region, each of the two second LC regions comprising a plurality of LC sub-regions arranged at intervals,
   wherein the equilateral polygon is an equilateral octagon, and the equilateral octagon comprises:
   two first edges parallel to a long edge of the display panel;
   four second edges; and
   two third edges perpendicular to the first edges and parallel to a short edge of the display panel.

7. The LC dropping and distributing method according to claim 6, wherein the step of forming the second LC region comprises:
   forming two first LC sub-regions, the two first LC sub-regions being symmetric about the second symmetric axis and spaced apart, and being located at a side of the second edge far away from a center of the equilateral octagon, the first LC sub-region being a parallelogram, the parallelogram having a first group of edges and a second group of edges, the first group of edges being parallel to the second edge of the equilateral octagon;
   forming two second LC sub-regions, the two second LC sub-regions being symmetric about the second symmetric axis and spaced apart, and being located at a side of the first LC sub-regions far away from the first LC region, the second LC sub-region being a right triangle, a right angle of the right triangle being located at a corner of the display panel, and a hypotenuse of the right triangle being parallel to the first group of edges; and
   forming a third LC sub-region, the third LC sub-region being symmetric about the second symmetric axis and being located between the two first LC sub-regions, the third LC sub-region being a rectangle, a group of edges of the rectangle being parallel to the third edge; wherein one edge of the second group of edges, the first edge, and one right-angle side of the right triangle are collinear to form a long edge of a display region, one edge of the rectangle far away from the equilateral octagon and the other right-angle sides of two right triangles form a short edge of the display region.

8. The LC dropping and distributing method according to claim 7, wherein a length of an edge of the second group of edges is as same as a length of an edge of the equilateral octagon.

9. A cell assembling method, comprising:

providing a first substrate;

dropping and distributing a liquid crystal (LC) onto the first substrate according to the LC dropping and distributing method according to claim 1, to form a LC layer;

providing a second substrate, and assembling the second substrate with the first substrate to form a cell, so that the LC layer between the second substrate and the first substrate is diffused uniformly, wherein the equilateral polygon is an equilateral hexagon, and the equilateral hexagon comprises:

two first edges parallel to a long edge of the display panel; and four second edges.

10. The cell assembling method according to claim 9, wherein the step of forming the second LC region comprises:

forming two first LC sub-regions, the two first LC sub-regions being symmetric about the second symmetric axis and spaced apart, and being located at a side of the second edge far away from a center of the equilateral hexagon, the first LC sub-region being a parallelogram, the parallelogram having a first group of edges and a second group of edges, the first group of edges being parallel to the second edge of the equilateral hexagon; and forming two second LC sub-regions, the two second LC sub-regions being symmetric about the second symmetric axis and spaced apart, and being located at a side of the first LC sub-regions far away from the first LC region, the second LC sub-region being a right triangle, a right angle of the right triangle being located at a corner of the display panel, and a hypotenuse of the right triangle being parallel to the first group of edges; wherein one edge of the second group of edges, the first edge, and one right-angle side of the right triangle are collinear to form a long edge of a display region, and the other right-angle sides of two right triangles form a short edge of the display region.

11. The cell assembling method according to claim 10, wherein a length of an edge in the second group of edges is as same as a length of an edge of the equilateral hexagon.

12. The cell assembling method according to claim 10, wherein at a side of the long edge of the display region, a spaced distance between the equilateral hexagon and the parallelogram is a first spaced distance, a spaced distance between the parallelogram and the right triangle is a second spaced distance, and the first spaced distance is equal to the second spaced distance; and at a side of the short edge of the display region, a spaced distance between the right triangle and the parallelogram is a third spaced distance, a spaced distance between two parallelograms is a fourth spaced distance, and the third spaced distance is equal to the fourth spaced distance.

13. The cell assembling method according to claim 12, wherein at the side of the short edge of the display region, a sum of the fourth spaced distance and two third spaced distances is a length of the right-angle side of the right triangle at the side of the short edge.

14. A cell assembling method, comprising:

providing a first substrate;

dropping and distributing a liquid crystal (LC) onto the first substrate according to the LC dropping and distributing method according to claim 6, to form a LC layer;

providing a second substrate, and assembling the second substrate with the first substrate to form a cell, so that the LC layer between the second substrate and the first substrate is diffused uniformly, wherein the equilateral polygon is an equilateral octagon, and the equilateral octagon comprises:

two first edges parallel to a long edge of the display panel;

four second edges; and two third edges perpendicular to the first edges and parallel to a short edge of the display panel.

15. The cell assembling method according to claim 14, wherein the step of forming the second LC region comprises:

forming two first LC sub-regions, the two first LC sub-regions being symmetric about the second symmetric axis and spaced apart, and being located at a side of the second edge far away from a center of the equilateral octagon, the first LC sub-region being a parallelogram, the parallelogram having a first group of edges and a second group of edges, the first group of edges being parallel to the second edge of the equilateral octagon;

forming two second LC sub-regions, the two second LC sub-regions being symmetric about the second symmetric axis and spaced apart, and being located at a side of the first LC sub-regions far away from the first LC region, the second LC sub-region being a right triangle, a right angle of the right triangle being located at a corner of the display panel, and a hypotenuse of the right triangle being parallel to the first group of edges; and forming a third LC sub-region, the third LC sub-region being symmetric about the second symmetric axis and being located between two first LC sub-regions, the third LC sub-region being a rectangle, a group of edges of the rectangle being parallel to the third edge; wherein one edge of the second group of edges, the first edge, and one right-angle side of the right triangle are collinear to form a long edge of a display region, one edge of the rectangle far away from the equilateral octagon and the other right-angle sides of two right triangles form a short edge of the display region.

16. The cell assembling method according to claim 15, wherein a length of an edge of the second group of edges is as same as a length of an edge of the equilateral octagon.

* * * * *